Nov. 5, 1963  A. L. GOOD  3,109,902
PRESSURE CONTROL SWITCH
Filed Nov. 6, 1959  4 Sheets-Sheet 1
FIG. 1
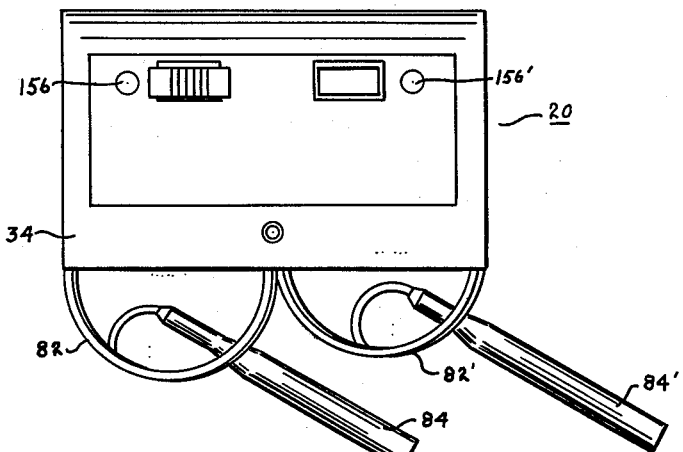
FIG. 2
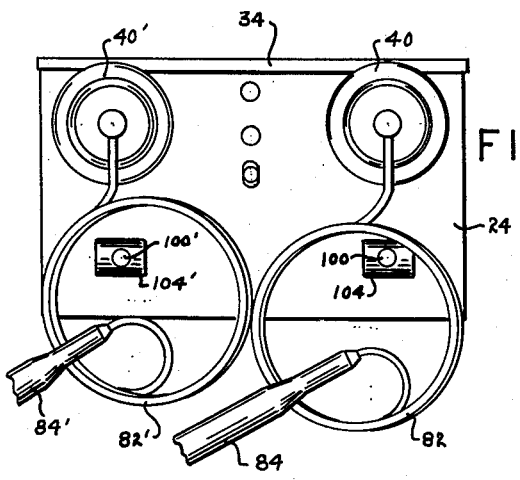
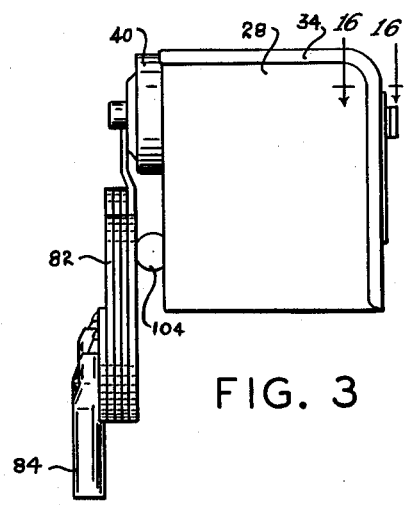
FIG. 3
FIG. 4
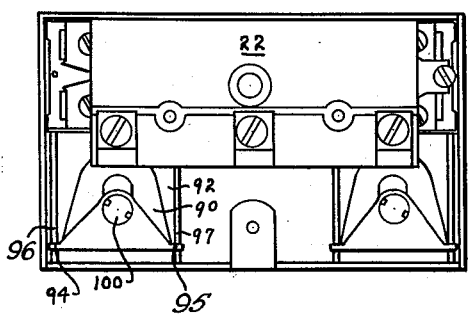
INVENTOR.
ARTHUR L. GOOD
BY M. A. Hobbs
ATTORNEY

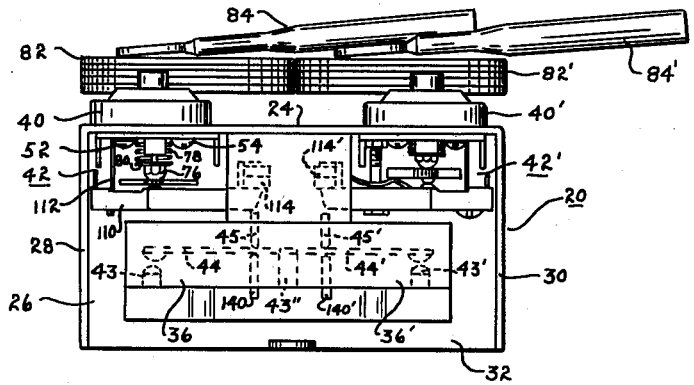
FIG. 5
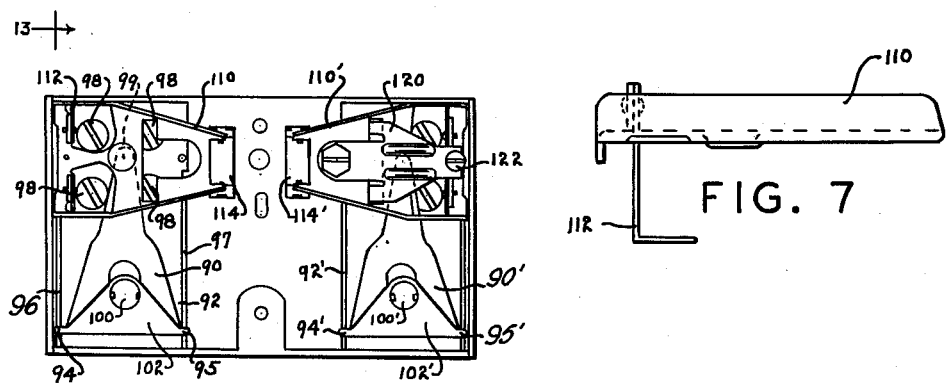
FIG. 6   FIG. 7
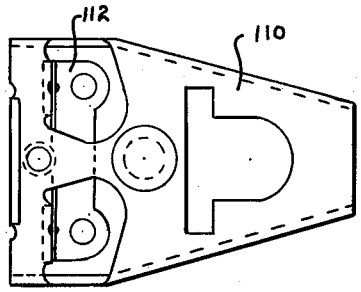
FIG. 8
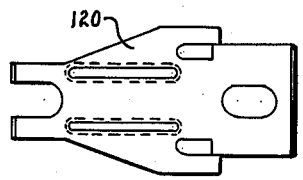
FIG. 9
FIG. 10
*INVENTOR.*
ARTHUR L. GOOD
BY
ATTORNEY INVENTOR.
ARTHUR L. GOOD
BY M. A. Hobbs
ATTORNEY Nov. 5, 1963 A. L. GOOD 3,109,902
PRESSURE CONTROL SWITCH
Filed Nov. 6, 1959 4 Sheets-Sheet 4

INVENTOR.
ARTHUR L. GOOD
BY *m. a. Hobbs*
ATTORNEY ns with
United States Patent Office 3,109,902
Patented Nov. 5, 1963

3,109,902
PRESSURE CONTROL SWITCH
Arthur L. Good, Goshen, Ind., assignor, by mesne assignments, to Robertshaw Controls Company, a corporation of Delaware
Filed Nov. 6, 1959, Ser. No. 851,291
13 Claims. (Cl. 200—83)

The present invention relates to an electrical switch and more particularly to a pressure actuated electrical control switch.

One of the principal objects of the present invention is to provide a pressure control switch for refrigeration systems and the like which is versatile in design and construction and which can be readily adapted to a large variety of installations without substantial changes or modifications in the component parts of the control unit.

Another object of the invention is to provide a compact, rugged pressure responsive control which can be set for either a cut-in or cut-out operation with an increase or decrease of pressure through an inclusive pressure setting range from a vacuum to high pressure, for example, up to at least 500 p.s.i.

Still another object is to provide a control mechanism of the aforesaid type which can be readily installed and adjusted to the desired setting, and which will maintain the desired setting for an indefinite period of time without any readjusting or otherwise servicing the device.

Additional objects and advantages of the invention will become apparent from the following description and accompanying drawings, wherein:

FIGURE 1 is a front elevational view of the present control showing it before it is installed on a refrigerating apparatus or the like;

FIGURE 2 is a rear elevational view of the control unit shown in FIGURE 1 before it is installed;

FIGURE 3 is a side elevational view of the control unit shown in FIGURES 1 and 2;

FIGURE 4 is a front elevational view of the control unit shown in the preceding figures, with the cover removed to show the operating mechanism of the control;

FIGURE 5 is a top plan view of the control unit with the cover removed to show further details of the operating mechanism;

FIGURE 6 is an elevational view of the lever linkage between the pressure responsive mechanism and the electrical switch mechanism;

FIGURE 7 is a side elevational view of one of the lever arms of the linkage shown in FIGURE 6;

FIGURE 8 is a plan view of the lever arm shown in FIGURE 7;

FIGURE 9 is a side elevational view of another of the lever arms of the linkage shown in FIGURE 6;

FIGURE 10 is a plan view of the lever arm shown in FIGURE 9;

Figure 11:
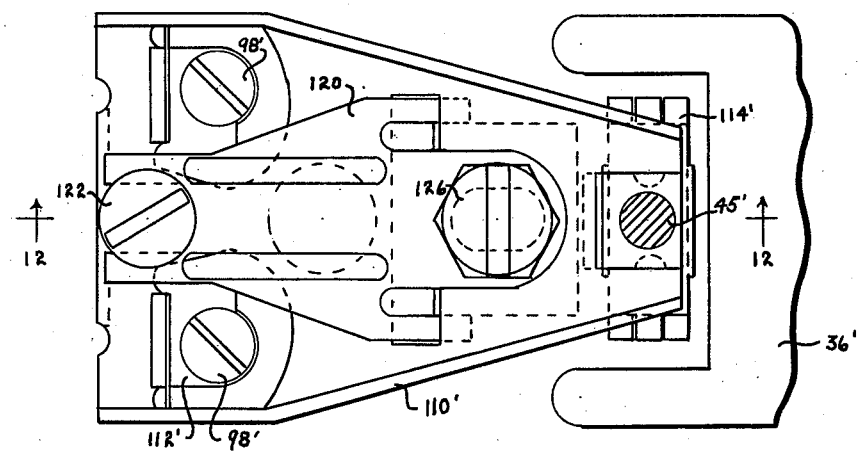
FIGURE 11 is an enlarged plan view of the linkage shown in FIGURE 6.

Referring more specifically to the drawings, numeral 20 designates generally my control device, having a dual switch mechanism 22 secured to rear wall 24 of the housing 26 of the control device, the housing having end walls 28 and 30, bottom 32 and a removable cover 34 enclosing the top and front of the device. The two separate switches 36 and 36' are operated by pressure responsive elements 40 and 40' through lever assemblies 42 and 42', respectively. The switch mechanism may be of any suitable construction, the preferred form being the type shown and described in detail in my copending application Serial No. 752,816, now U.S. Patent No. 2,971,069, filed August 4, 1958, having fixed contact elements 43, 43' and 43'', movable leaf contact elements 44 and 44', operating pins 45 and 45' actuated by lever assemblies 42 and 42' to either close or open the respective switch 36 or 36', depending on the arrangement of the switches in the switch mechanism. In view of the complete disclosure of the switch mechanism 22 in my copending application, this mechanism will not be described in detail herein; only the parts necessary for a full understanding of the remainder of the control will be specifically referred to in the description herein.

Figure 15:
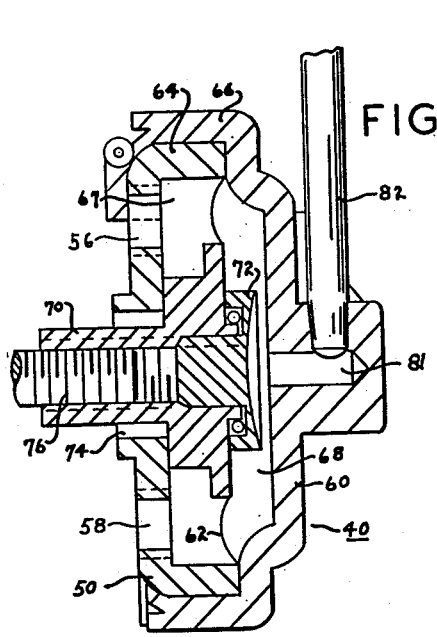
FIGURE 15 is a vertical cross sectional view of the pressure responsive mechanism shown in FIGURE 14, taken on line 15—15 of the latter figure.
Figure 14:
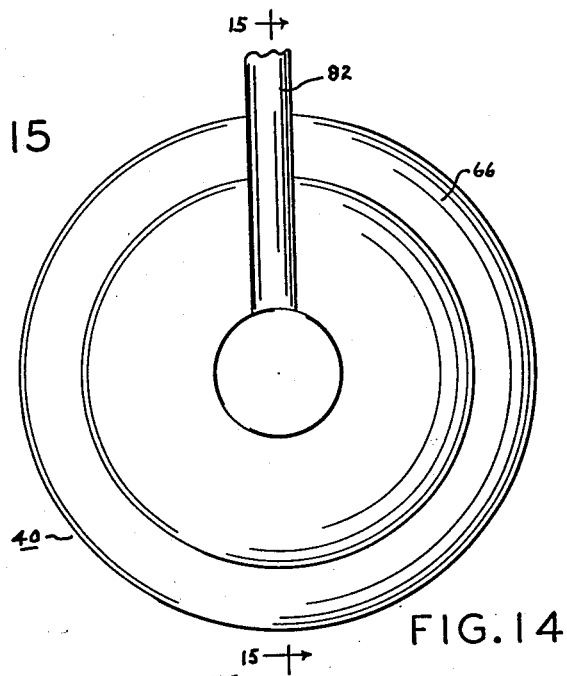
FIGURE 14 is an elevational view of one of the pressure responsive mechanisms forming a part of the present control.
Figure 16:
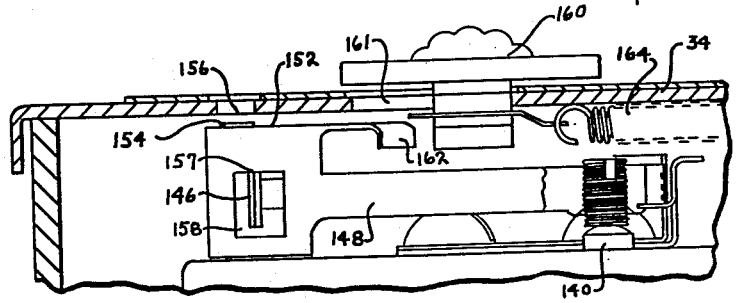
FIGURE 16 is a top plan view of one of the reset mechanisms shown with the front cover on the control unit in cross section, taken on line 16—16 of FIGURE 3.

Each pressure responsive element 40 and 40', only the former to be described in detail herein since both elements are alike in construction and operation, consists of a cup-shaped base 50 adapted to be secured to rear wall 24 by screws 52 and 54 extending through said wall and being threaded into holes 56 and 58 of the base, and a cover 60 secured to said base and being separated therefrom from the base by a flexible diaphragm 62 having its edges secured in fluid tight relationship between the side walls 64 and 66 of the base and cover, respectively. The diaphragm may be of any suitable material, brass or copper-beryllium preferably being used, and the diaphragm preferably being given its final shape with the cup-shaped sides between walls 64 and 66 during the assembly operation of the pressure responsive elements. The diaphragm divides the interior of the elements into chambers 67 and 68 and carries a stem 70 secured to the center of the diaphragm by a screw 72 and extending through an opening 74 in the base into the control housing for actuating the lever assembly. The stem is hollow and includes a plunger 76 for contacting the lever assembly, and is urged toward the assembly by a coil spring 78 disposed around the stem and reacting between a collar 80 on the plunger and the internal wall of the housing. Chamber 67 is vented to the atmosphere through opening 74 and chamber 68 is connected by a passage 81 and capillary tube 82 to a thermostat bulb 84 placed at a selected location in a refrigerating system, for example. The bulb may be filled with a volatile liquid or a vapor which creates a pressure in the bulb, capillary tube and chamber 68, which varies with changes in the temperature surrounding the bulb. The pressure in chamber 68 urges diaphragm 62 to the left as seen in FIGURE 15 in opposition to the force applied to plunger 76 by the lever assembly, to be more fully explained hereinafter. Either bulb may be omitted and the respective capillary tube connected directly with a desired part of the refrigerant system.

The lever assembly 42 consists of a main spring 90, one end of which is pivotally mounted on a supporting bracket 92 with fingers 94 and 95 seating in slots near one end of the bracket in the edge of the outwardly turned side walls 96 and 97, the bracket being secured to rear wall 24 by a plurality of screws 98. The end 99 of spring 90 opposite the pivot contacts plunger 76 and opposes the force on the plunger created by the pressure in chamber 68. The tension on spring 90 is varied to satisfy requirements by a screw 100 extending through a tongue 102 of the spring and through bracket 92 and rear wall 24 into a nut 104 on the back of the rear wall. Increasing the force on the free end of tongue 102 by tightening screw 100 increases the pressure exerted by the free end of spring 90 on plunger 76 and thus increases the pressure in chamber 68 required to actuate the switch mechanism. After screw 100 has been adjusted to give the desired tension on spring 90, a set screw 106 is tightened in nut 104 until it engages the end of screw 100 and thus forms a stop for the latter screw. The set screw is then severed at neck 108 and staking compound applied thereto to hold it permanently in the set position. The force applied to diaphragm 62 by the pressure in chamber 68 is transmitted through stem 70, plunger 76, and spring 90 to main arm 110 and thence to operating pin 45 of switch 36. Arm 110 is pivoted on a hinge 112 consisting of an L-shaped member, the lower portion of which is secured to bracket 92, and the upright portion of which is riveted to arm 110. This hinge is constructed of resilient metal sheet material with sufficient rigidity to give the required support to the arm yet with sufficient flexibility that there is no substantial force tending to counteract the force transmited through spring 90. A resilient member 114 consisting of two arcuate leaf elements joined to each other at their ends is preferably interposed between the free end of arm 110 and switch operating pin 45 to absorb any overtravel of the arm in actuating the switch and thus to prevent damage to the parts of the switch if the control is not accurately adjusted.

Figure 12:
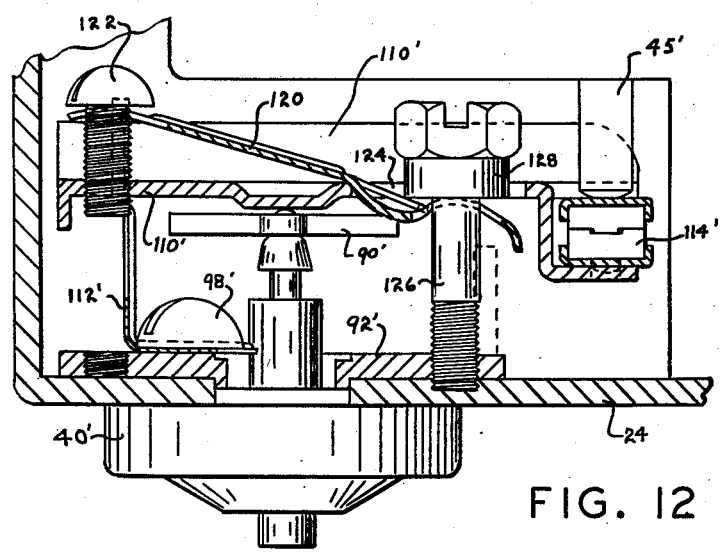
FIGURE 12 is a cross sectional view of the linkage shown in FIGURE 11, taken on line 12—12 of the latter figure.
Figure 13:
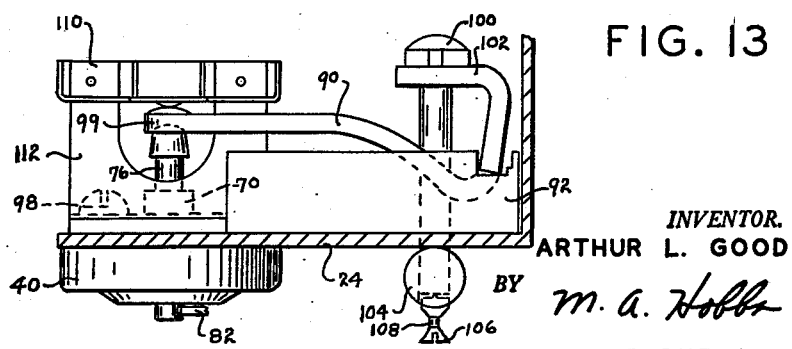
FIGURE 13 is a cross sectional view of a portion of the unit, taken on line 13—13 of FIGURE 6.

The lever assembly 42 just described constitutes a fully operating structure for transmitting the force exerted on diaphragm 62 to switch 36 and one which can be adjusted to various operating conditions by merely turning screw 100 inwardly or outwardly to increase or decrease the tension on the free end of spring 90. It is sometimes desirable to vary the force required to operate the switch mechanism as the pressure in chamber 68 is increased, to increase the pressure range between the high level point at which the switch is actuated by the increase in pressure chamber 68 and the low level point at which the switch returns to its original position. This is accomplished by including a second spring 120 which becomes effective at a predetermined point in the operation of arm 110', to complement the force of main spring 90'. The latter spring is a leaf type element secured at one end to the hinged end of arm 110' by a screw 122 extending through the end of the spring and being threaded into the arm. The other end of spring 120 extends through a slot 124 from the top side of arm 110, as seen in FIGURE 12, to the under side near the free end thereof and is held from moving in the switch operating direction by a screw 126 extending through the spring into bracket 92'. With this construction, when pressure is applied to arm 110' by spring 90', the arm and spring 120 move together until the spring abuts against the head 128 of the screw. Thereafter spring 120 applies a force on arm 110', increasing the total force ultimately required to operate the switch mechanism. The force applied to arm 110' by spring 120 can be readily varied and adjusted by turning screw 126 inwardly or outwardly and thereby increasing or decreasing the effective force of the spring on arm 110'. The low level point at which the switch returns to its original position may likewise be changed by reversing the position of screws 122 and 126 and by including minor required modifications in the shape of spring 120.

In the operation of the present control thus far described, the pressure created in bulb 84 is transmitted by capillary tube 82 to chamber 68 where it exerts a force on diaphragm 62 urging stem 70 and plunger 76 to the left, as seen in FIGURE 15. This force is opposed by spring 90, and also spring 120 if included in lever assembly 42, and when the spring forces are overcome by fluid pressure on the diaphragm, arm 110 is moved in the direction to move pin 45 and operate switch 36. The control parts consisting of pressure responsive element 40', lever assembly 42' and switch 36' operate in the same manner as the corresponding control parts described in detail above. The two sets of control parts operate independently of each other and are adjustable to respond to different degrees of temperatures and/or pressures.

Figures 17, 18:
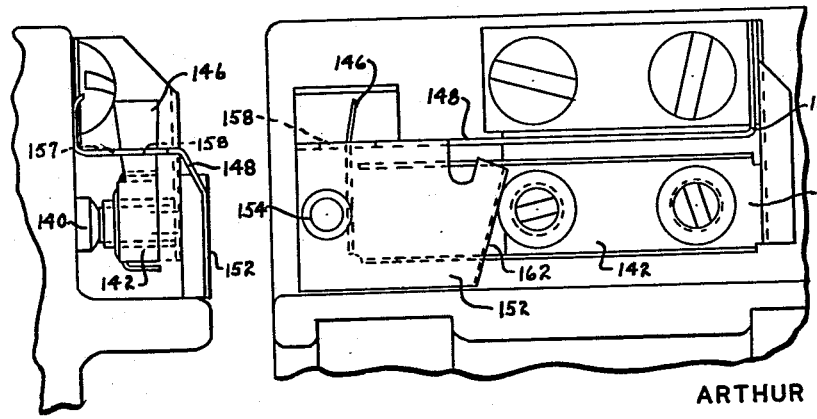
FIGURE 17 is a front elevational view of the reset mechanism shown in FIGURE 16.
FIGURE 18 is a side elevational view of the reset mechanism shown in FIGURES 16 and 17.

Switches 36 and 36' may be either the type which remains closed or open until manually or mechanically operated to open or closed position, or the type which will remain closed or open only as long as a force is applied to the switches. In either situation, it is often desirable for the operator to detect readily whether the switches have been actuated. In the present switch mechanism, pins 140 and 140' extend through the switch body and are moved outwardly simultaneously with the operation of pins 45 and 45', respectively. Each pin operates a signal device, only one being described in detail, consisting of an arm 142 of resilient sheet metal secured to the switch body adjacent pin 140 and extending along the body beneath the front part of cover 34. This arm pivots at its base 144 and carries an upwardly extending finger 146, viewed in FIGURE 17, on its free end and is movable outwardly, i.e. toward the cover, at its free end by pin 140. A second arm 148 is pivoted on the switch body adjacent pin 140 and above arm 142 and extends parallel with arm 142 directly beneath the cover. This arm is adapted to pivot vertically from its base 150, as viewed in FIGURE 17. The free end of arm 148 carries a small panel 152 facing outwardly and having a small red dot 154 or other indicator which registers with a small hole 156 in the front of the cover to indicate that the switch has been actuated. Finger 146 projects through an opening 158 in the upper side of arm 148 and when said arm is lifted, the shoulder 157 formed by the edge of the opening automatically slips over the top of finger 146 and retains arm 148 in its elevated position. While arm 148 and panel 152 are in this position, the red dot can not be seen through hole 156. When pin 140 pushes arm 142 forward, finger 146 is disengaged from shoulder 157 of opening 158, permitting arm 148 and panel 152 to return to their lower position where the red dot registers with hole 156. In the foregoing operation the switch is actuated by the increase of pressure in chamber 68 acting through lever assembly 42 on pins 45 and 140. The indicator may also be operated when the pressure is decreased and pins 45 and 140 move inwardly. In this latter operation, finger 146 slips under shoulder 157 of opening 158 and holds arm 148 in its lifted position until pin 140 retracts and releases lever 148.

After arm 148 has been released from finger 146, the indicator device is manually reset by a button 160 sliding in a slot 161 on the front cover into engagement with angular edge 162 of panel 152 to force the panel and arm 148 upwardly to the point where finger 146 will again snap under shoulder 157 of opening 158 and retain arm 148 and panel 152 in their elevated position and the red dot out of registry with hole 156. Button 160 is retracted from angular edge 162 by a spring 164 anchored to the back side of the front cover.

The present invention can be embodied in a single or dual control and various subcombinations of the invention may be used alone or with other types of control mechanisms without departing from the scope of the invention. Further changes and modifications may be made to satisfy requirements.

I claim:

1. In a pressure responsive switch: the combination comprising a base, a fixed electrical contact, a movable electrical contact, a pin for operating said movable contact, a pressure responsive mechanism mounted on said base and including a housing having two chambers therein, a diaphragm separating said chambers, a bulb containing an expansible fluid, a capillary tube connecting said bulb with one of said chambers, a stem connected to said diaphragm and extending from said housing, a resilient metal member turned upon itself and having long and short overlying sections, a means pivoting said member at a point near the juncture between said sections, the end of said long section opposite said pivot point being connected to said stem and opposing the force of fluid pressure in said last mentioned chamber, an adjustment screw extending through said short section near the free end thereof and through said long section into said base, an arm in contact with said resilient metal member pivoted at one end and operatively connected at the other end to said operating pin, a spring means mounted at one end on said arm and anchored at the other end to said base, said spring engaging said arm at a point spaced from either end of said spring means, a resilient means interposed between said arm and said pin, a movable lever pivoted at one end having a means defining a shoulder, a panel mounted on the end of said lever opposite the pivoted end and having an indicator thereon, a second lever pivoted at one end and movable in a direction transverse to the direction of movement of said first lever, a finger mounted on the end of said second lever opposite the pivoted end for engaging the shoulder on said first lever when in one position to retain said panel in a selected position and thereby indicate whether the switch mechanism has been actuated, means for manually moving said first lever and panel to said selected position, and means connecting said second lever to said arm for operating said second lever when said movable element is operated.

2. In a pressure responsive switch: the combination comprising a base, a fixed electrical contact, a movable electrical contact, a pin for operating said movable contact, a pressure responsive mechanism mounted on said base and including a housing having two chambers therein, a diaphragm separating said chambers, a bulb containing an expansible fluid, a capillary tube connecting said bulb with one of said chambers, a stem connected to said diaphragm and extending from said housing, a resilient metal member turned upon itself and having long and short overlying sections, a means pivoting said member at a point near the juncture between said sections, the end of said long section opposite said pivot point being connected to said stem and opposing the force of fluid pressure in said last mentioned chamber, an adjustment screw extending through said short section near the free end thereof and through said long section into said base, an arm in contact with said resilient metal member pivoted at one end and operatively connected at the other end to said operating pin, a spring means mounted at one end on said arm and anchored at the other end to said base, said spring engaging said arm at a point spaced from either end of said spring means, a movable lever pivoted at one end having a means defining a shoulder, a panel mounted on the end of said lever opposite the pivoted end and having an indicator thereon, a second lever pivoted at one end and movable in a direction transverse to the direction of movement of said first lever, a finger mounted on the end of said second lever opposite the pivoted end for engaging the shoulder on said first lever when in one position to retain said panel in a selected position and thereby indicate whether the switch mechanism has been actuated, and means connecting said second lever to said arm for operating said second lever when said movable element is operated.

3. In a pressure responsive switch: the combination comprising a base, a fixed electrical contact, a movable electrical contact, a pressure responsive mechanism mounted on said base and including a housing having two chambers therein, a diaphragm separating said chambers, a stem connected to said diaphragm, means connecting one of said chambers with a source of fluid pressure, a resilient metal member turned upon itself and having long and short overlying sections, said member being pivoted at a point near the juncture between said sections, the end of said long section opposite said pivot point being connected to said stem and opposing the force of fluid pressure in said last mentioned chamber, an adjustment screw extending through said short section near the free end thereof and through said long section into said base, an arm in contact with said resilient metal member pivoted at one end and operatively connected at the other end to said operating pin, a movable lever pivoted at one end having a means defining a shoulder and having an indicator thereon, a second lever pivoted at one end and movable in a direction transverse to the direction of movement of said first lever, a finger mounted on the end of said second lever opposite the pivoted end for engaging the shoulder on said first lever when in one position to retain said indicator in a selected position and thereby indicate whether the switch mechanism has been actuated, and means connecting said second lever to said arm for operating said second lever when said movable element is operated.

4. In a presure responsive switch: a base, a fixed electrical contact, a movable electrical contact, a pin for operating said movable contact, a pressure responsive mechanism mounted on said base including a housing having two chambers therein, a diaphragm separating said chambers, a bulb containing an expansible fluid, a capillary tube connecting said bulb with one of said chambers, a stem connected to said diaphragm and extending from said housing, a resilient metal member turned upon itself and having long and short overlying sections, said member being pivoted at a point near the juncture between said sections, the end of said section opposite said pivot point being connected to said stem and opposing the force of fluid pressure in said last mentioned chamber, an adjustment screw extending through said short section near the free end thereof and through said long section into said base, an arm in contact with said resilient metal member pivoted at one end and operatively connected at the other end to said operating pin, a spring means mounted at one end on said arm and anchored at the other end to said base, said spring means engaging said arm at point spaced from either end of said spring means, and a resilient means interposed between said arm and said pin.

5. In a pressure responsive switch: a base, a movable electrical contact, a pressure responsive mechanism mounted on said base and including a housing having two chambers therein, a diaphragm separating said chambers, a bulb containing an expansible fluid, a capillary tube connecting said bulb with one of said chambers, a stem connected to said diaphragm and extending from said housing, a resilient metal member turned upon itself and having long and short overlying sections, a means pivoting said member at a point near the juncture between said sections, the end of said long section opposite said pivot point being connected to said stem and opposing the force of fluid pressure in said last mentioned chamber, an adjustment screw extending through said short section near the free end thereof and through said long section into said base, and an arm in contact with said resilient metal member pivoted at one end and operatively connected at the other end to said movable contact.

6. In a pressure responsive switch: a base, a movable electrical contact, a pressure responsive mechanism mounted on said base and including a housing having two chambers therein, a diaphragm separating said chambers, a stem connected to said diaphragm, means connectiong one of said chambers with a source of fluid pressure, a resilient metal member turned upon itself and having long and short overlying sections, a means pivoting said member at a point near the juncture between said sections, the end of said long section opposite said pivot point being connected to said stem and opposing the force of fluid pressure in said last mentioned chamber, an adjustment screw extending through said short section near the free end thereof and through said long section into said base, an arm in contact with said resilient metal member pivoted at one end and operatively connected at the other end to said movable contact, and a spring means mounted at one end on said arm and anchored at the other end to said base, said spring means engaging said arm at a point spaced from either end of said spring means.

7. In a pressure responsive switch: a base, a movable electrical contact, a pressure responsive mechanism mounted on said base and including a housing having two chambers therein, a diaphragm separating said chambers, a stem connected to said diaphragm, means connecting one of said chambers with a source of fluid pressure, a resilient metal member turned upon itself and having long and short overlying sections, a means pivoting said member at a point near the juncture between said sections, the end of said long section opposite said pivot point being connected to said stem and opposing the force of fluid pressure in said last mentioned chamber, an adjustment screw extending through said short section near the free end thereof and through said long section into said base, and an arm in contact with said resilient metal member pivoted at one end and operatively connected at the other end to said movable contact.

8. In a pressure responsive switch: a base, a movable electrical contact, a pressure responsive mechanism mounted on said base and having a chamber therein, a stem connected to said mechanism, means connecting said chamber with a source of fluid pressure, a metal spring turned upon itself and having long and short overlying sections, said spring being pivoted at a point near the juncture between said sections, the end of said section opposite said pivot point being connected to said stem and opposing the force of fluid pressure in said chamber, an adjustment screw extending through said short section near the free end thereof and through said long section into said base, an arm in contact with said spring pivoted at one end and operatively connected at the other end to said movable contact, and a spring means mounted at one end on said arm and anchored at the other end to said base, said spring means engaging said arm at a point spaced from either end of said spring means.

9. In a pressure responsive switch: a base, a movable electrical contact, a pressure responsive mechanism mounted on said base and having a chamber therein, a stem connected to said mechanism, means connecting said chamber with a source of fluid pressure, a metal spring turned upon itself and having long and short overlying sections, said spring being pivoted at a point near the juncture between said sections, the end of said section opposite said pivot point being connected to said stem and opposing the force of fluid pressure in said chamber, an adjustment screw extending through said short section near the free end thereof and through said long section into said base, and an arm operatively connected to said spring and to said contact.

10. In a pressure responsive switch: a movable electrical contact, a pressure responsive mechanism having a chamber therein, a stem connected to said mechanism, means connecting said chamber with a source of fluid pressure, a resilient metal member turned upon itself and having long and short overlying sections, said member being pivoted at a point near the juncture between said sections, the end of said section opposite said pivot point being connected to said stem and opposing the force of fluid pressure in said chamber, and an arm pivoted at one end and operatively connected at the other end to said movable contact.

11. In a pressure responsive switch: a base, a movable electrical contact, a pressure responsive mechanism mounted on said base and having a chamber therein, means connecting said chamber with a source of fluid pressure, an arm pivoted at one end and operatively connected at the other end to said movable contact, a spring mounted at one end on said arm and anchored at the other end to said base, said spring engaging said arm at a point spaced from either end of said spring, and a spring means operatively connecting said arm with said pressure responsive means.

12. In a pressure responsive switch mechanism: a movable electrical contact, a pressure responsive means for operating said contact, a movable lever pivoted at one end having a means defining a shoulder, a panel mounted on the end of said lever opposite the pivoted end and having an indicator thereon, a second lever pivoted at one end and movable in a direction transverse to the direction of movement of said first lever, a finger mounted on the end of said second lever opposite the pivoted end for engaging the shoulder on said first lever when in one position to retain said panel in a selected position and thereby indicate whether the switch mechanism has been actuated, means for manually moving said first lever and panel to said selected position, and means connecting said second lever to said pressure responsive means for operating said second lever when said movable contact is operated.

13. In a switch mechanism: a movable lever with a shoulder thereon pivoted at one end and having an indicator at the other end, a second lever pivoted at one end and movable in a direction transverse to the direction of movement of said first lever, a finger mounted on the end of said second lever opposite the pivoted end for engaging the shoulder on said first lever when in one position to retain said indicator in a selected position and thereby indicate whether the switch mechanism has been actuated, means for manually moving said first lever and indicator to said selected position, and means for operating said second lever in response to the operation of the switch mechanism.

References Cited in the file of this patent

UNITED STATES PATENTS

| | | |
|---|---|---|
| 2,028,893 | Bondurant | Jan. 28, 1936 |
| 2,480,538 | Barr | Aug. 30, 1949 |
| 2,536,831 | Allan | Jan. 2, 1951 |
| 2,636,093 | Clark et al. | Apr. 21, 1953 |
| 2,783,333 | Witherspoon | Feb. 26, 1957 |
| 2,854,555 | Edmunds | Sept. 30, 1958 |
| 2,895,025 | Miller | July 14, 1959 |
| 2,905,795 | Platz | Sept. 22, 1959 |
| 2,934,618 | Beller et al. | Apr. 26, 1960 |